United States Patent

[11] 3,631,944

[72] Inventors: Jerzy Leon Courtenay
Wolverhampton;
Francis John Neal, Brewood, both of England
[21] Appl. No. 55,432
[22] Filed: July 16, 1970
[45] Patented: Jan. 4, 1972
[73] Assignee: H. M. Hobson Limited
London, England

[54] PLURAL DRIVE WITH DIFFERENTIAL BRAKES
2 Claims, 3 Drawing Figs.
[52] U.S. Cl. .................................. 192/3 R, 74/661, 74/710.5, 188/82.3
[51] Int. Cl. ........................................ F16d 63/00
[50] Field of Search ........................... 192/3 R, 3 H; 74/661, 710.5; 188/82.3, 82.34, 82.5

[56] References Cited
UNITED STATES PATENTS

| | | | |
|---|---|---|---|
| 1,256,446 | 2/1918 | Doucette | 188/82.3 X |
| 2,258,307 | 10/1941 | Vickers | 192/3 |
| 2,831,554 | 4/1958 | Reynolds | 192/3 |
| 2,945,572 | 7/1960 | Rye | 192/3 X |
| 3,439,579 | 4/1969 | Guinot | 192/3 X |

*Primary Examiner*—Benjamin W. Wyche
*Attorneys*—E. T. Le Gates and Martin Kirkpatrick ABSTRACT: The combination with a hydraulically rotated shaft of a brake comprising unidirectional braking mechanisms which are selectively operable, when applied, one to brake the shaft when it is rotating clockwise and the other to brake the shaft when it is rotating anticlockwise, a piston coupled to the braking mechanisms and subject to the hydraulic pressure which is effective to drive the shaft, the piston maintaining the braking mechanisms in inoperative positions when subject to hydraulic pressure, and a spring biasing the servo piston and operative to apply the braking mechanisms upon removal of the hydraulic pressure.

PLURAL DRIVE WITH DIFFERENTIAL BRAKES

This invention provides a brake for locking a hydraulically rotated shaft when hydraulic pressure is not available.

The brake according to the invention comprises unidirectional braking mechanisms which are selectively operable, when applied, one to brake the shaft when it is rotating clockwise and the other to brake the shaft when it is rotating anticlockwise, a piston coupled to the braking mechanisms and subject to the hydraulic pressure which is effective to drive the shaft, the piston maintaining the braking mechanisms in inoperative positions when subject to hydraulic pressure, and a spring biasing the servopiston and operative to apply the braking mechanisms upon removal of the hydraulic pressure.

Preferably each braking mechanism comprises a cage mounted to rotate with rotate with respect to the shaft and carrying rollers contacting the shaft and arranged to become wedged in recesses in the cage by rotation of the shaft when the cage is rotated into a brake-applying position.

One embodiment of the invention, as applied to a pair of differentially coupled hydraulic motors, is illustrated in the accompanying drawing, in which:

FIG. 3 is a similar view, showing the brakes on.

Figure 1:
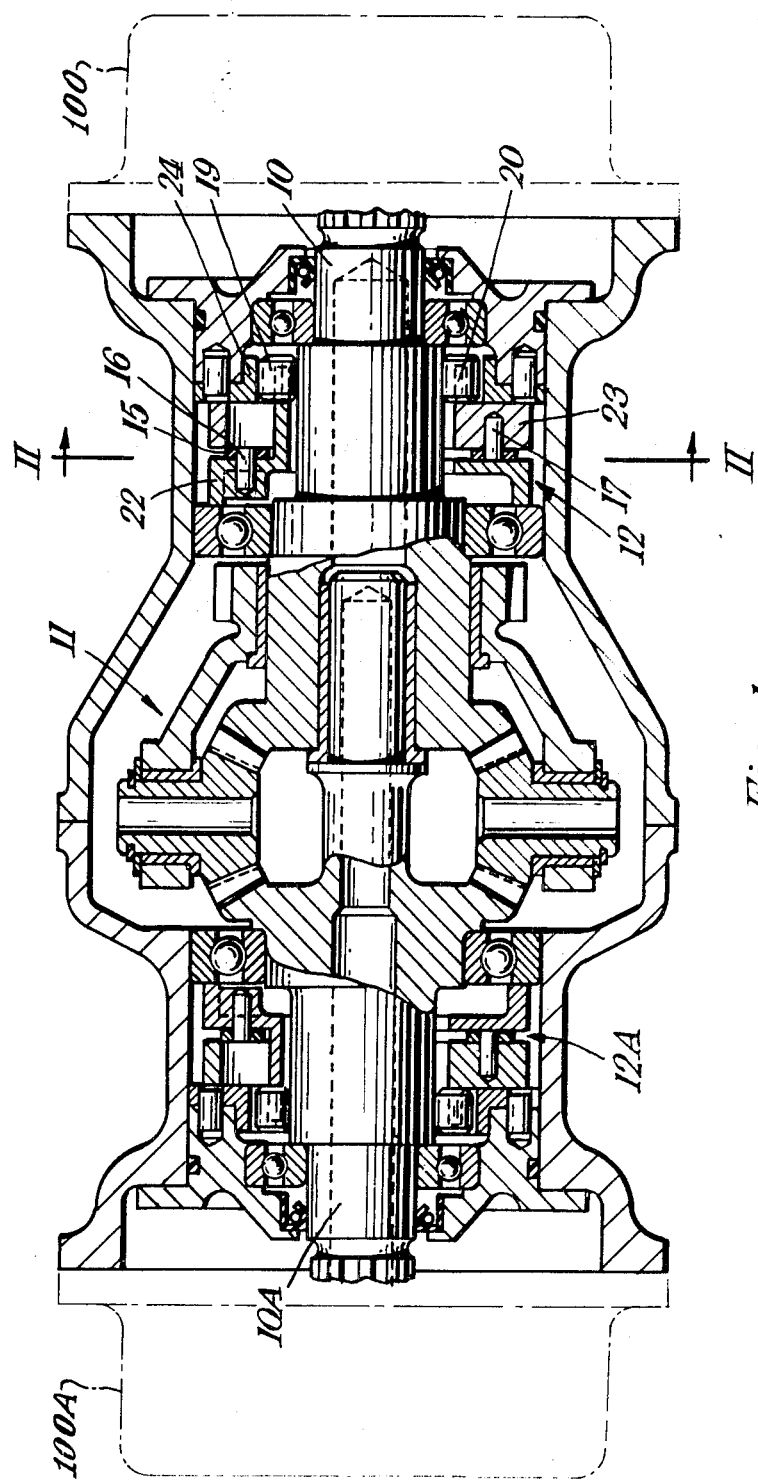
FIG. 1 is a vertical section.

FIG. 1 shows a pair of hydraulic motors 100, 100A whose output shafts, designated 10, 10A respectively, are coupled by a differential gear 11. Each motor is provided with a respective pressure-off brake 12, 12A for locking its shaft when hydraulic pressure is not available. Brakes 12, 12A are identical and therefore only brake 12 will be described in detail.

Figure 2:
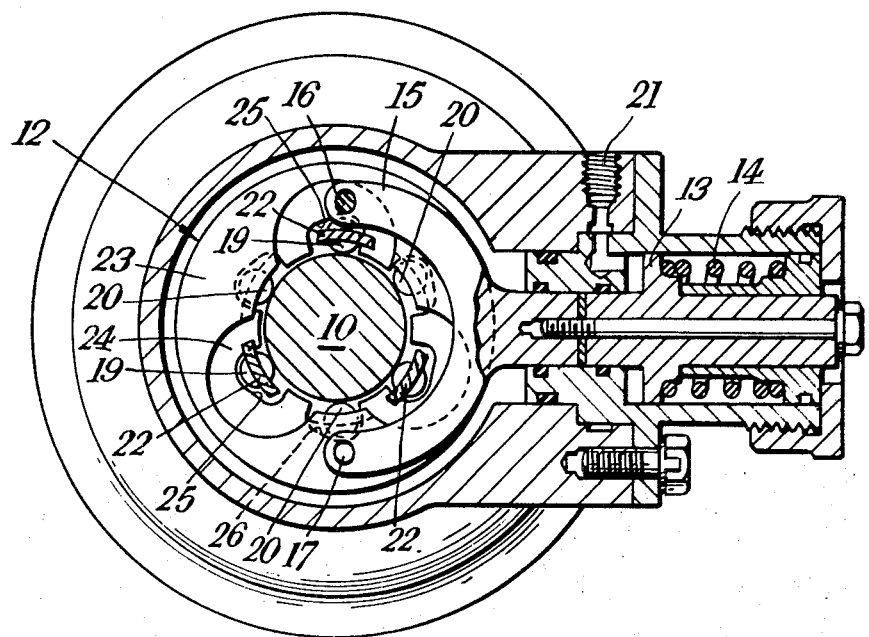
FIG. 2 is a section on the line II—II in FIG. 1, showing the brakes off.
Figure 3:
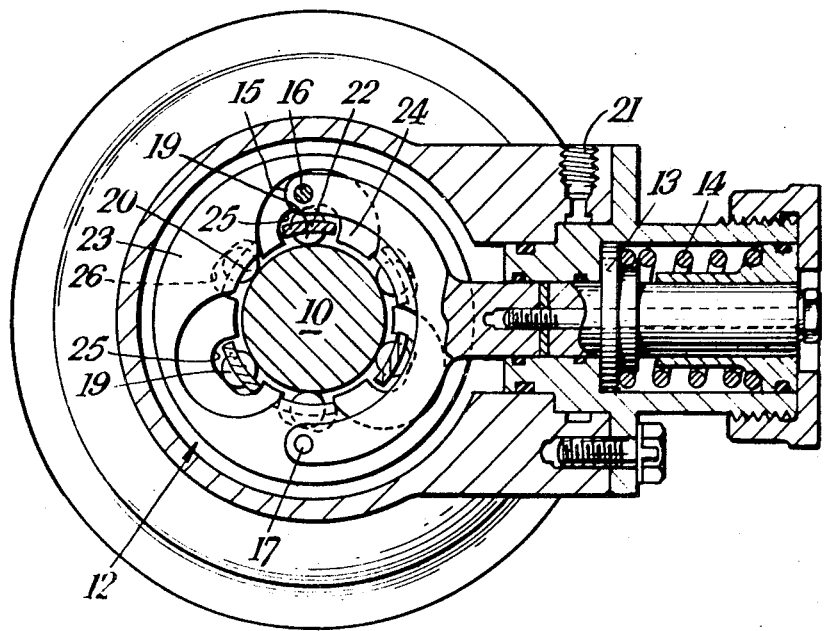

As shown in FIGS. 2 and 3, each brake includes a piston 13, loaded by a spring 14, in opposition to hydraulic pressure admitted through an inlet 21, and connected to a stirrup 15 carrying two pegs 16, 17. Slotted cages 22, 23, which are mounted to rotate about the axis of the shaft 10 are pivoted respectively to the pins 16, 17 and carry rollers 19, 20 disposed in recesses in a fixed cam plate 24. So long as hydraulic pressure is applied to the piston 13 in opposition to the pressure of the spring 14, the cages 22, 23 are maintained in the inoperative position shown in FIG. 2, in which the rollers 19, 20 roll freely in contact with the shaft 10. Upon removal of the hydraulic pressure, the spring 14 will move the stirrup 15 to the left to the position shown in FIG. 3 to cause the peg 16 to rotate the cage 22 anticlockwise to effect jamming of the rollers 19 in recesses 25 in the cam plate to lock the shaft 10 if it is rotating anticlockwise and to cause the peg 17 to rotate the cage 23 clockwise to effect jamming of the rollers 20 in recesses 26 in the cam plate to lock the shaft if it is rotating clockwise. When the hydraulic pressure is restored to the inlet 21, the force of the spring 14 is overcome and the stirrup 15 is moved by the piston 13 to take off the brake.

If one of the differentially coupled motors fails, its shaft will become locked by its brake enabling the other motor to drive the output load, e.g. the flap control unit of an aircraft, under full load at half speed.

What we claim as our invention and desire to secure by Letters Patent is:

1. The combination, with a pair of hydraulic motors each having an output shaft, of a differential gear coupling said output shafts and a pair of brakes each associated with a respective one of said output shafts, each of said brakes comprising a pair of unidirectional braking mechanisms which are selectively operable, when applied, one to brake the respective output shaft when the output shaft is rotating clockwise and the other to brake said output shaft when said output shaft is rotating anticlockwise, a piston coupled to both braking mechanisms and subject to the hydraulic pressure supplying the hydraulic motor driving said output shaft, said piston maintaining the braking mechanisms in inoperative positions when subject to hydraulic pressure, and a spring biasing the piston and operative to apply the braking mechanisms upon removal of the hydraulic pressure.

2. A combination as claimed in claim 1, in which each of said brakes includes a fixed cam plate and each braking mechanism of said brake comprises a cage mounted to rotate with respect to the respective output shaft and coupled to the piston, said cage-carrying rollers contacting the output shaft and arranged to become wedged in recesses in the cam plate by rotation of the shaft when the cage is rotated by the piston into a brake-applying position.

* * * * *